United States Patent [19]

Schmidt et al.

[11] Patent Number: 4,823,535
[45] Date of Patent: Apr. 25, 1989

[54] DEVICE FOR UNLOADING X-RAY FILM CASSETTES

[75] Inventors: Manfred Schmidt, Kirchheim; Johann Zanner, Unterhaching, both of Fed. Rep. of Germany

[73] Assignee: Agfa-Gevaert AG, Leverkusen, Fed. Rep. of Germany

[21] Appl. No.: 152,022

[22] Filed: Feb. 3, 1988

[30] Foreign Application Priority Data

Feb. 25, 1987 [DE] Fed. Rep. of Germany ....... 3706046

[51] Int. Cl.4 .......................... B65B 5/10; B65B 43/38; B65G 65/04
[52] U.S. Cl. .................................... 53/266 R; 53/382; 271/97; 271/98; 414/211
[58] Field of Search ..................... 53/266 R, 244, 249, 53/381 R, 382, 167; 414/403, 404, 411, 416; 271/309, 195, 211, 97, 98, 99, 106, 283

[56] References Cited

U.S. PATENT DOCUMENTS

| 3,158,367 | 11/1964 | Tarbuck | 271/97 |
| 3,168,308 | 2/1965 | Walton et al. | 271/97 |
| 3,828,195 | 8/1974 | Snarr | 414/411 |
| 3,891,854 | 6/1975 | Hura | 414/411 X |
| 4,049,142 | 9/1977 | Azzaroni | 414/411 X |
| 4,354,336 | 10/1982 | Azzaroni | 414/411 X |
| 4,364,550 | 12/1982 | Hynes | 271/97 X |
| 4,369,960 | 1/1983 | Brisebarre | 271/97 X |
| 4,480,423 | 11/1984 | Müller | 53/382 X |
| 4,514,958 | 5/1985 | Hoorn | 53/382 X |
| 4,526,359 | 7/1985 | Garavuso | 271/98 X |
| 4,531,723 | 7/1985 | Watson | 271/99 X |
| 4,539,794 | 9/1985 | Azzaroni | 53/266 R X |
| 4,553,369 | 11/1985 | Debes et al. | 53/382 X |
| 4,577,452 | 3/1986 | Hösel et al. | 53/266 R |
| 4,590,738 | 5/1986 | Hösel et al. | 53/266 R |

FOREIGN PATENT DOCUMENTS 8434977 8/1985 Fed. Rep. of Germany .
3527549 8/1986 Fed. Rep. of Germany .

Primary Examiner—Horace M. Culver
Attorney, Agent, or Firm—Michael J. Striker

[57] ABSTRACT

In a device for unloading X-ray film cassette a nozzle is provided, positioned at a front side of the cassette to be unloaded, for blowing air into a gap between a slightly open lid and the remaining part of the cassette. The nozzle is switched on for short intervals to ensure blow air stream which generate vacuum under the film stuck to the lid to pull the film back towards the bottom of the cassette so that a reliable separation of the film by a sucker is ensured.

11 Claims, 2 Drawing Sheets

DEVICE FOR UNLOADING X-RAY FILM CASSETTES

BACKGROUND OF THE INVENTION

The present invention relates to a device for unloading X-ray film cassettes of the type in which a cassette to be unloaded is received in a compartment and further comprising means for the insertion and discharging the cassettes, means for a light tight closing of the compartment, a device for opening the lid or cover plate of the cassette, a blower which includes at least one nozzle positioned between the housing and the lid of the cassette for separating a film to be removed from the cassette, means to remove the film from the cassette and an electric or electronic control device by means of which all the means of the device are controlled.

The device of the foregoing type is disclosed, for example in U.S. Pat. No. 3,828,195. The cassette to be emptied is inclined downwardly in the direction of the film removal and, must be open to allow the film to be moved to the transport rollers due to inclination of the cassette. Thereby with an unfavorable air ratio, the film would neither hang on the cassette nor be guided from the cassette and the air stream before the leading side of the cassette would be directed upwardly and the film would be chipped off.

A second similar device for unloading film cassettes for cassettes with a forward-side closable film insertion and a film removal slot has been disclosed in DE-GMS 84 34 977. The cassette in this device is directed with its slot for unloading the films vertically downwardly, and the film being removed from the cassette is gravity-moved away from the cassette. To hold the film on the inner surface of the cassette the air blow is directed against the slot.

Cassette unloaders in which the cassette being unloaded is positioned horizontally and has a liftable or pivotable lid have a specific tacking effect between the cassette and the film. The film normally sticks to the lid or the lid-side reinforcement foil, and this normally pushes the film upwardly against the force of gravity. If such tacking effect is not sufficient and the film drops back onto the bottom of the cassette the sucker which serves to remove the film from the cassette will engage the bottom-side reinforcement foil rather than the film being removed. This causes, with very fast-operated unloaders, unexpected function disturbances which can lead to the damage of the illuminated film and the cassette itself. To avoid this tacking effect various means have been proposed, for example suction cups on the bottom of the cassette as disclosed in DE-PS 35 37 549. The upper edges of such suction cups have been often used up in the process and therefore did not fulfill their function.

SUMMARY OF THE INVENTION

It is an object of the present invention to provide an improved X-ray film cassette unloading device.

It is another object of the invention to provide such a cassette unloader in which not only chipping off of the film being removed from the cassette would be prevented but also the film attached to the lid or the lid-side reinforcement foil would be pulled back to the bottom of the cassette, and no extensive wear would occur on the structural components of the film removing arrangements.

These and other objects of the invention are attained by a device for unloading X-ray film cassettes, comprising means defining a compartment for receiving a cassette to be unloaded; means for driving the cassette in and out of the compartment; means for light tight closing said compartment; means for lifting a lid of said cassette; air blowing means which include at least one nozzle directed to the partially lifted lid of said cassette for separating a film being removed from the cassette; means for removing the film from the cassette; and a control device for controlling all said means, said nozzle being positioned at said cassette and formed such that an air stream produced thereby is blown below a film stuck towards said lid into a gap between a bottom portion of said cassette and said lid as an acutely directed blow air stream, said nozzle being switchable on for short intervals by said control device so that vacuum is generated laterally of said stream between said film and said bottom portion whereby said film is sucked by said vacuum from said lid downwardly.

Due to the short-time switching on of the sharply directed air stream of this invention this stream blows not onto the forward side of the film being removed from the cassette but acts according to the principle of the water jet pump or hydrodynamic paradox whereby vacuum is generated below the film and the latter is sucked back towards the bottom of the cassette by gravity and very quickly.

Should the film remain on the bottom of the cassette the air stream acts on the upper side of the film whereby vacuum would not be sufficient to pull the film against its gravity force to the lid or cover plate. Vacuum generated due to the air blow is also sufficient to quickly overcome adhering between the film and the lid so that the film under gravity would drop from the lid. This vacuum, however, is not sufficient to lift the film against its gravity force when the film must remain on the bottom of the cassette.

In such a device used for unloading cassettes of different formats wherein all cassettes are positionable in the direction of insertion of the cassette at the same corner thereof, said nozzle may be directed opposite to the direction of insertion and near the corner of the cassette positionable in said compartment.

Also the nozzle may be directed opposite to said direction of insertion and be in such a position in said compartment, which is near a corner which is next to said positionable corner of the cassette of the smallest format, as measured in the direction transversal to said direction of insertion, between two front-side cassette corners.

The device may further include an additional nozzle spaced from the positonable corner of the cassette of the smallest format.

The device may further include means for positioning the cassette in the direction transversal to the direction of insertion, said positioning means and said nozzle being supported for a joint displacement.

The lid may be pivotable relative to said bottom portion about a rear side of the cassette as viewed in said direction of insertion, said side being perpendicular to said direction of insertion.

The lid may be pivotable about a side of the cassette parallel to the direction of insertion and said nozzle is positioned transversely of said direction of insertion and before a side of the cassette parallel to the side having an axis of pivoting of said lid.

The device may include suckers for removing the film and further suckers to load the cassette with a new film removed from a film supply magazine, and further include an air pump which is common for said suckers, said further suckers and said nozzle.

The pressure of said blow air stream may be 4 to 7 bar.

The gap between the slightly even lid and the cassette may be about 10 mm.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 3 is greatly reduced plan view of the cassette unloading device for treating films of various formats.

DETAILED DESCRIPTION OF THE PREFERRED EMBODIMENTS

Figure 1:
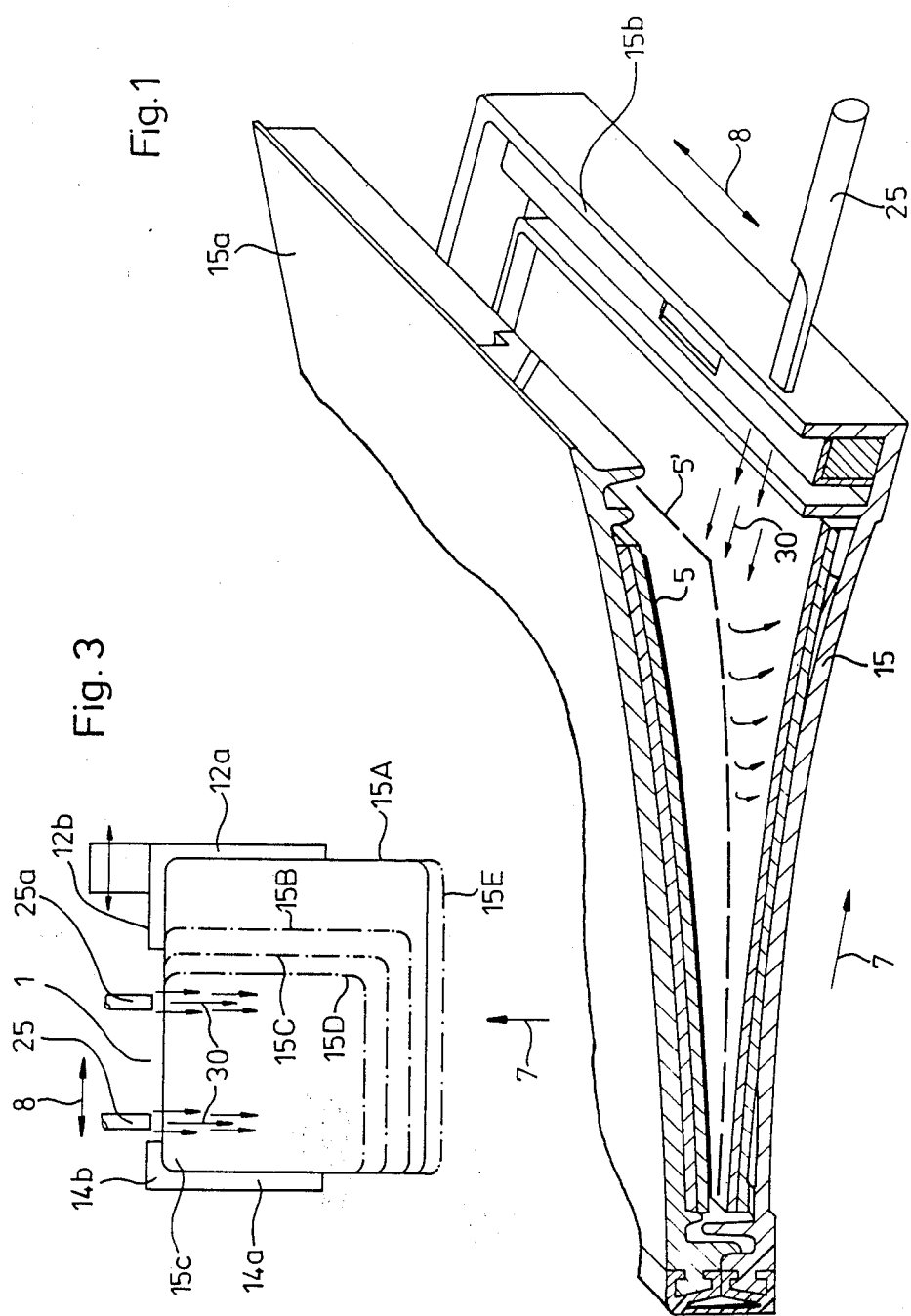
FIG. 1 is a broken perspective view of the device of the invention.

For explaining possible embodiments of the invention the device for unloading X-ray film cassette according to DE-PS 32 32 187 will be explained with reference to FIGS. 2 and 3. The device of this invention can be applied to other conventional devices for unloading film cassettes having liftable lids. Only important features of the known device for unloading film cassettes which are essential for understanding of the present invention will be mentioned herein below.

Reference numeral 1 designates a compartment for receiving a cassette while reference numberal 2 denotes a known transport means for driving the cassette in and out of the compartment 1. These transport means can include transport rollers positioned on the bottom of the compartment. At the front side of the compartment, are positioned known means for releasing an abutment or stop provided on the cassette. These means can, for example include a slide provided with a non-shown toothing with which a locking bar of the cassette comes into engagment. Due to the movement transversal to the cassette-transporting direction the locking bar is actuated so that the lid of the cassette, for example due to the action of weak springs, rebounds or is lifted by hooks 6a provided on the pivotable side elements 6.

One of the cassette opening means must be displaceable in the non-shown fashion in the direction of arrow 8 which is transversal to the direction of insertion of the cassette, indicated by arrow 7 so as to be automatically adjusted to the format of the cassette usable with this device. At the front side, above and/or before the device for opening of the cassette, known means 9, 10, 11 for the removal of the film from the cassette and the insertion of a new film into the cassette are positioned. The loading and unloading means mainly comprise suitable suckers 9 which are controlled by an electronic control device 20 and correspond to transport roller pairs 10, 11. A number of film supply magazines 4 are provided each containing films of a certain format different from the format of another film supply magazine. Such a magazine supplies films of a predetermined format into the cassette being used. In addition, either an intermediate magazine for collecting films removed from the cassettes is provided (non-shown) or the unloading device is connected directly to the developing machine for the removed films.

The determination of the format of a given cassette and the selection and feeding of the new film takes place automatically, for example in accordance with an automatic measurement of at least one side of the cassette. Before or during the determination of the film format the inserted cassette must be precisely positioned in compartment 1. Therefore the reciprocal displacement of the cassette in the direction of arrow 8 transversal to the cassette insertion direction 7 must be obtained. The device for this transversal displacement includes, for example a clamping jaw 12 formed as two rectangular angled pieces 12a, 12b which are connected with displaced elements, for example 6, 6a for positioning the cassette 15. The displaceable clamping jaw 12 is movable relative to a further clamping jaw 14 which is stationary in the transversal direction 8 and includes two rectangular angled pieces 14a, 14b. Portions or pieces 14a, 14b form lateral and front-side stops for the cassette 15 transported by the transport means in compartment 1. Both clamping jaws 12, 14 are formed so that their portions 12b, 14b directed towards each other are in alignment. The cassette moved relative to stops 14a, 14b, during movement of the clamping jaw 12, is simply clamped and thereby positioned. The cassette being transported, located between the clamping jaw 14 and displaceable clamping jaw 12 positioned in the initial position is moved upon the movement of the clamping jaw 12 under the additional action of the transport means relative to stops 14b, 12b and is aligned between legs or portions 14a, 12a. Switch contacts are provided at front-side portions or legs 14b, 12b of the jaws for cassettes of various sizes. The switch contacts switch on the drive for the displaceable clamping jaws 12, 14, 6 when a newly inserted cassette is engaged between the jaws. Further switches can be formed, for example as light limiting switches or microswitches which can be passed by switching arms during the positioning movement and determine, by means of the control device 20, a cassette format. Of course, any other suitable conventional devices for sensing the cassette format and positioning the cassettes can be utilized.

Figure 2:
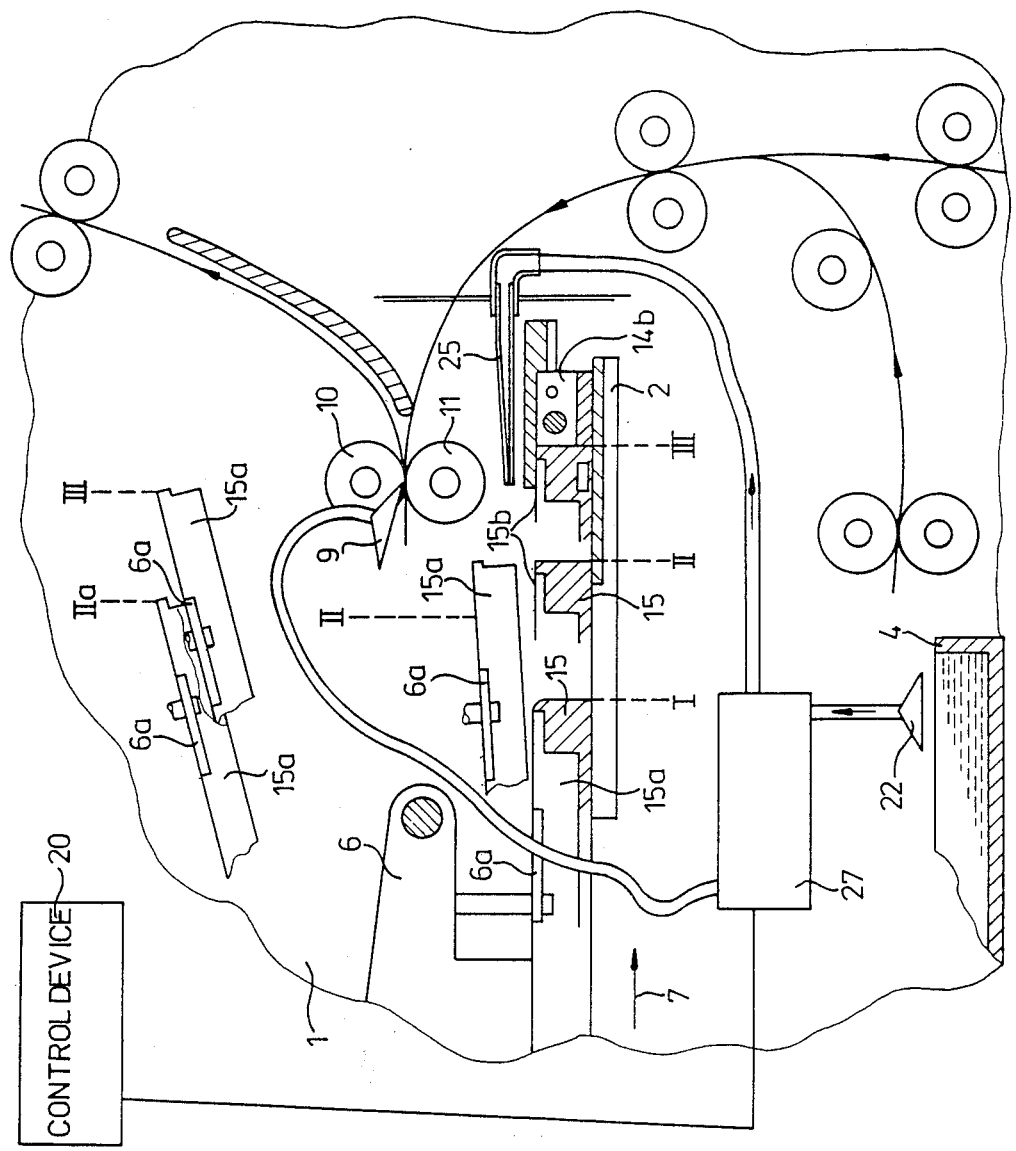
FIG. 2 is a partially sectional schematic view of the cassette-unloading device parallel to the direction of unloading.

As shown in FIG. 2, cassette 15, as known, has a pivotable or liftable lid 15a. Each cassette inserted into compartment 1 can be moved from the first stop position I, in which the transversal displacement device 12 is switched on, to the second position II, in which lid 15 opens by a small play, and then lid 15a can, in the position IIa, open completely so that the exposed film is removed from the cassette by a sucker 9; then cassette 15 is moved further in the direction of arrow 7 to its third position III, in which a new film is inserted into the housing of the cassette. For transporting the exposed film from the cassette and inserting a new film into the cassette, serves the transport roller pair 10, 11 positioned above upper edge 15b or at the front side of the cassette. A sucker 22 serves to remove a new film from the respective film supply magazine 4 while transport roller system 35 guides this new film towards the roller pair 10, 11.

The device according to the invention includes at least one nozzle 25 positioned before or above the upper edge 15b at the front side of the cassette. Nozzle 25 is aligned in the direction of the film insertion 26, which is approximately parallel to the direction of arrow 7. Nozzle 25 as well as suckers 9 and 22 are connected to an air pump 27. The latter is electrically connected to the electronic control device 20 so that the pump, the suckers and the nozzle are respectively switched on and off by the electronic control device. Suckers 9, 22 are connected to the suction side of the pump 27 while nozzle or nozzles 25 are connected to the blower side of the pump 27.

Nozzle 25 is switched on by control device 20 periodically when the cassette 15 and its lid 15a are in the position II and lid 15a, also as shown in FIG. 1, is opened such that a relatively small play is provided between the housing of the cassette 15 and its lid 15a. If, upon further opening of the lid 15a the latter would drop sucker 9 would not suck the film 5 and remove it from the cassette 15 but instead the film would engage with the reinforcement foil positioned on the bottom of the cassette. This can lead to damaging of the film and the cassette. Nozzle 25 is so arranged that is blows air directly over the upper edge 15b of the housing portion of the cassette and below the edge of the underside of lid 15 and thus below the film 5 being taken off from the cassette. The air stream 30 is acutely aligned and focused and is very strong. Due to the position of the nozzle 25 air 30 blows in the direction of the wedge-shaped gap between the lid 15a and the cassette housing. Due to the small size of the gap and its tendency to become smaller the acute air flow or beam 30 of the nozzle 25 which is switched on only for a short time operates according to the principle of a water jet pump or according to the hydrodynamic paradox. The air beam entrains laterally positioned air and generates vacuum in its environment. This vacuum, generated below the film stuck at the lid 15a due to the air blow is sufficient, also with the aid of the film weight, to release the film 5 from lid 15a with a high sped and absolute reliability and pull the film towards the housing portion of the cassette. In order to emphasize this action the film is shown in FIG. 1, as acted upon by the suction of air stream 30 and thereby pulled downwards, in an intermediate position 5' illustrated by the dotted line. Until the lid 15a is sufficiently opened for the removal of film 5 from the cassette, which is indicated as the position IIa, the film to be removed lies on the bottom of the housing portion of the cassette while sucker 9 is applied thereto and removes it despite high speeds of the processes described.

As also shown, for a reliable pulling off of the film 5 from the gap by the air stream 30 at the slightly open lid 15a, a single, suitably dimensioned nozzle is sufficient when the air stream is sufficiently precise and the nozzle is arranged in a proper position. Such proper position is located near the stationary clamping jaw portions 14a, 14b before the gap near the respective corner of the compartment 1, at which the corner 15c of cassettes 15 of all formats 15A to 15E are positioned. It is also possible to provide one or two nozzles 25a near the corner adjacent to the corner 15c next to the displaceable clamping jaw portions 12a, 12b. This, however, means that to adjust to various formats 15A to 15E the so-positioned nozzles must be displaceable together with displaceable clamping jaw portions 12a, 12b. It is also conceivable that a second nozzle 25a be stationarily positioned near the place which corresponds to the corner of the cassette next to the corner 15c of the cassette of the smallest format 15D, naturally lying within the width of the cassette (FIG. 3). When the cassette of the greatest format is used the air stream 30 of nozzle 25a acts on the middle region of the cassette or the film. With a suitable dimensioning of the nozzle 25a and its air stream, all required separations of the films from the cassettes can be obtained.

Any other modifications of the invention are also possible. It is not required in the device of this invention that cassettes 15 be moved in positions I, II and III according to FIG. 2. It is only necessary that air blow be switched on only when lid 15a is open with a very small gap. The front-side gap between the housing of the cassette 15 and its lid 15a is specifically favorable when it is no greater than 10 mm. Pressure of 4 to 7 bar is particularly suitable to obtain a required air stream 30.

If the film unloading device is designed so that the transport of the cassette to be unloaded takes place in the direction of arrow 7 the lid of the cassette is pivotable about the axis parallel to the direction of arrow 7 so that the air blowing nozzle will be positioned at the compartment wall extending in the direction of arrow 7 relative to the pivot axis of the lid of the cassette.

The device according to the invention functions also when instead of a pivotable lid a liftable lid is provided on the cassette insertable into compartment 1. Such a lid can be lifted from the cassette housing by means of suckers and held in the lifted positioned. In this case it should be taken into consideration during dimensioning the air stream that such a stream should be blown not into the wedge-shaped narrowing gap but into the gap of the constant height.

It will be understood that each of the elements described above, or two or more together, may also find a useful application in other types of devices for unloading X-ray film cassettes differing from the types described above.

While the invention has been illustrated and described as embodied in a device for unloading X-ray film cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. In a device for unloading X-ray film cassettes, comprising means defining a compartment for receiving a cassette to be unloaded; means for driving the cassette in and out of the compartment; means for light-tight closing said compartment; means for lifting a lid of said cassette; air blowing means which include at least one nozzle directed to the partially lifted lid of said cassette for separating a film being removed from the cassette; means for removing the film from the cassette; and a control device for controlling all said means, the improvement comprising said nozzle being positioned at said cassette and formed such that an air stream produced thereby is blown below a film stuck towards said lid into a gap between a bottom portion of said cassette and said lid as an acutely directed blow air stream, said nozzle being switchable on for short intervals by said control device so that vacuum is generated laterally of said stream between said film and said bottom portion whereby said film is sucked by said vacuum from said lid downwardly.

2. The device as defined in claim 1, for unloading cassettes of different formats wherein all cassettes are positionable in the direction of insertion of the cassette at the same corner thereof, said nozzle being directed opposite to the direction of insertion and near the corner (15c) of the cassette positionable in said compartment.

3. The device as defined in claim 1, for unloading cassettes of different formats wherein all cassettes are positionable in said compartment in the direction of insertion of the cassette at the same corner thereof, said nozzle being directed opposite to said direction of insertion and being located in said compartment in a position, which is near a corner which is next to said positionable corner (15c) of the cassette of the smallest format (15D), as measured in the direction transversal to said direction of insertion between two front-side cassette corners.

4. The device as defined in claim 2, further including an additional nozzle spaced from the positionable corner (15c) of the cassette of the smallest format.

5. The device as defined in claim 3, further including an additional nozzle spaced from the positionable corner of the cassette of the smallest format.

6. The device as defined in claim 1; further including means for positioning the cassette in the direction transversal to the direction of insertion, said positioning means and said nozzle being supported for a joint displacement.

7. The device as defined in claim 1, wherein said lid is pivotable relative to said bottom portion about a rear side of the cassette as viewed in said direction of insertion, said side being perpendicular to said direction of insertion.

8. The device as defined in claim 1, wherein said lid is pivotable about a side of the cassette parallel to the direction of insertion and said nozzle is positioned transversely of said direction of insertion and before a side of the cassette parallel to the side having an axis of pivoting of said lid.

9. The device as defined in claim 1, said removing means including suckers, and wherein further suckers are provided to load the cassette with a new film removed from a film supply magazine; and further including an air pump which is common for said suckers, said further suckers and said nozzle.

10. The device as defined in claim 1, wherein pressure of said blow air stream is 4 to 7 bar.

11. The device as defined in claim 1, wherein said gap is about 10 mm.

* * * * *